Patented Dec. 22, 1925.

1,566,917

UNITED STATES PATENT OFFICE.

OLAF OLESEN, OF NEW YORK, N. Y.

FLEXIBLE CEMENT COMPOSITION.

No Drawing.  Application filed March 18, 1924.  Serial No. 700,168.

*To all whom it may concern:*

Be it known that I, OLAF OLESEN, a citizen of the United States, and a resident of the city of New York, borough of Manhattan, in the county and State of New York, have invented a new and Improved Flexible Cement Composition, of which the following is a full, clear, and exact description.

This invention relates to a composition of matter for use as a cement, and having particular qualities which characterize it as a flexible cement.

An object of the invention is to provide a composition which can be used as a cement and applied by a brush or trowel, or in any similar manner, to any desired surface more or less in the form of paint or plaster.

Another object concerns the provision of a composition which when manufactured can be packed in air-tight containers so that it will keep indefinitely without hardening or setting, the rate of setting being extremely slow.

A further object is the provision of a cement which has other characteristics hereinafter set forth.

In general, the invention comprises a cement formed by the proper association of sand and cement, preferably Portland cement, with suitable insoluble soaps. These soaps are preferably prepared of a mixture of saponifiable oil, such as linseed oil, with certain salts, such as zinc oxide and calcium oxide. By reason of the composition of the flexible cement, it is characterized by the fact that it hardens very slowly, is waterproof, can be stored in containers indefinitely without setting, is flexible, so that if applied to a surface and subsequently dried completely, that surface may be bent without the slightest injury to the cement. The composition is capable of having nails or other articles driven through it without cracking or splitting. The surface of the cement, after it has dried, may be easily washed, vacuum cleaned or sand blasted without injury. This cement is furthermore odorless when dry, is fire retarding, can be used to replace finishing coats on walls and ceilings, and also as a paint. It may, furthermore, be mixed with colors, either dry or in oil, without bleaching the same. It is insulating to heat and electricity; the surface of the cement when used as a coating is smooth and does not readily disintegrate; it is not inherently rough or granular, and does not rub off.

The characteristic properties of this cement are largely due to the presence with cement and sand of the insoluble soaps or oleates of the salts used in combination with the excess of saponifiable oil.

More specifically, the composition comprises the use of sand and Portland cement to which is added insoluble soaps of calcium and zinc. Preferably, the composition comprises eight parts of sand, four parts of cement, four parts of the calcium soap and one part of the zinc soap.

The calcium soap is formed as follows: A solution of lime water is formed by mixing five per cent of calcium oxide with ninety-five per cent of water. Forty per cent of this lime water is then added to sixty per cent of raw linseed oil. This mixture is thoroughly agitated and left standing, with occasional stirring, for twenty-four hours.

The zinc soap is formed as follows: A mixture of $66\frac{2}{3}$ per cent of zinc oxide and $33\frac{1}{3}$ per cent of raw linseed oil is made by heating and by thoroughly stirring them together. As soon as this mixture is formed it is immediately mixed with equal parts of raw linseed oil, and this whole mixture is then added to the calcium soap. This mixture of soaps is then thoroughly agitated and allowed to stand for twenty-four hours, with occasional stirring.

At the end of this time the soap mixture is added to the sand and cement, and as soon as this combination is thoroughly mixed it is packed in containers, preferably air-tight containers. The characteristics of the cement are such that if it is packed as soon as it is completed it will last indefinitely without hardening or setting in the container.

It will thus be seen that I have provided a simple and efficient, easily manufactured cement which has the various superior qualities set forth and which I am claiming in the appended claims.

What I claim is:—

1. A flexible cement, which comprises eight parts of sand, four parts of cement, four parts of a calcium soap, and one part of a zinc soap.

2. A flexible cement, which comprises eight parts of sand, four parts of cement, four parts of calcium soap, and one part of a zinc soap; the calcium soap comprising forty per cent lime water and sixty per cent raw linseed oil; the lime water comprising five per cent calcium oxide and ninety-five per cent water; the zinc soap comprising thirty-three and one-third per cent raw linseed oil and sixty-six and two-thirds per cent zinc oxide mixed together, to which has been added, after mixing, an equal quantity of raw linseed oil.

OLAF OLESEN.